United States Patent [19]
Fujio et al.

[11] Patent Number: 5,263,008
[45] Date of Patent: Nov. 16, 1993

[54] MAGNETO-OPTICAL DISK DEVICE HAVING A PLURALITY OF INDEPENDENTLY MOVING MAGNETO-OPTICAL HEADS IN THE HEAD WINDOW

[75] Inventors: Kazuyuki Fujio, Ayase; Akira Kawai, Yokohama; Shuzo Mizutani, Fujisawa; Katsuaki Ishimaru, Ebina, all of Japan

[73] Assignee: Tosoh Corporation, Shinnanyo, Japan

[21] Appl. No.: 753,658

[22] Filed: Aug. 30, 1991

[30] Foreign Application Priority Data

Aug. 31, 1990 [JP] Japan .................. 2-232147
Aug. 31, 1990 [JP] Japan .................. 2-232148
Aug. 31, 1990 [JP] Japan .................. 2-232149

[51] Int. Cl.⁵ .............................. G11B 11/00
[52] U.S. Cl. .............................. 369/13; 369/58; 360/114; 360/59
[58] Field of Search .............. 369/13, 58, 32, 14, 369/54, 47, 100; 360/114, 59, 72.1, 72.2; 365/122; 358/342

[56] References Cited

U.S. PATENT DOCUMENTS

| 4,802,021 | 1/1989 | Makagawa et al. ......... 369/13 X |
| 4,841,502 | 6/1989 | Murakami et al. ......... 369/13 |
| 4,845,696 | 7/1989 | Ohtsuki et al. ......... 369/13 |
| 4,926,408 | 5/1990 | Murakami et al. ......... 369/58 |

*Primary Examiner*—Steven Mottola
*Assistant Examiner*—Ali Neyzari
*Attorney, Agent, or Firm*—Oblon, Spivak, McClelland, Maier & Neustadt

[57] ABSTRACT

A magneto-optical disk device, in which data are written and read in and from a magneto-optical disk housed in a magneto-optical disk cartridge having a head window of a predetermined shape, comprises: first and second magneto-optical heads disposed so as to locate in the head window for accessing the magneto-optical disk; a center rail disposed substantially at the center of the window head along a diameter of the magneto-optical disk; a first side rail and a second side rail which are disposed parallelly with each other on both sides of the center rail; a first carriage slidably disposed between the center rail and the first side rail, and having at least a part of the first magneto-optical head mounted thereon; first driving means for driving the first carriage along the center rail; a second carriage slidably disposed between the center rail and the second side rail, and having at least a part of the second magneto-optical head mounted thereon; and second driving means for driving the second carriage along the center rail.

18 Claims, 15 Drawing Sheets

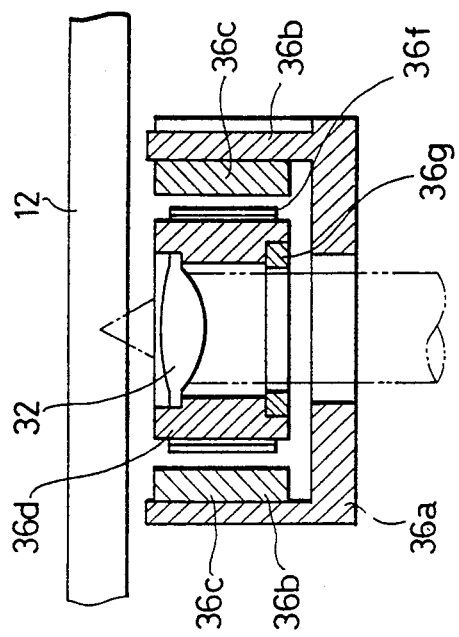
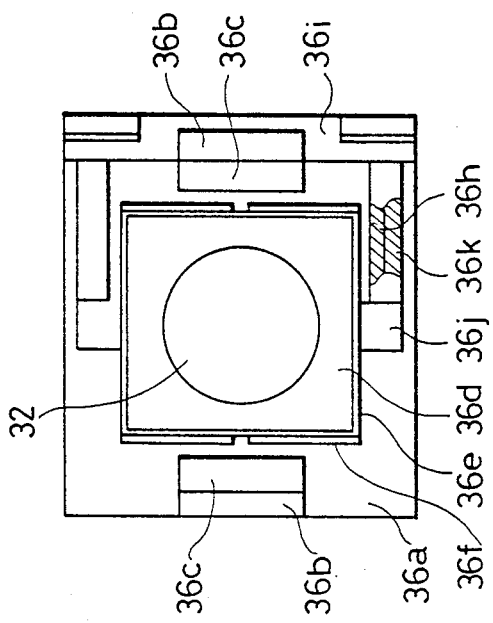
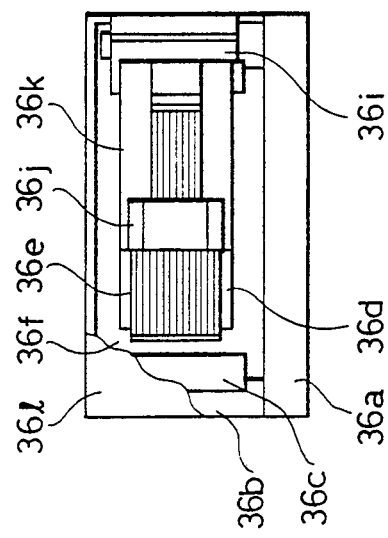
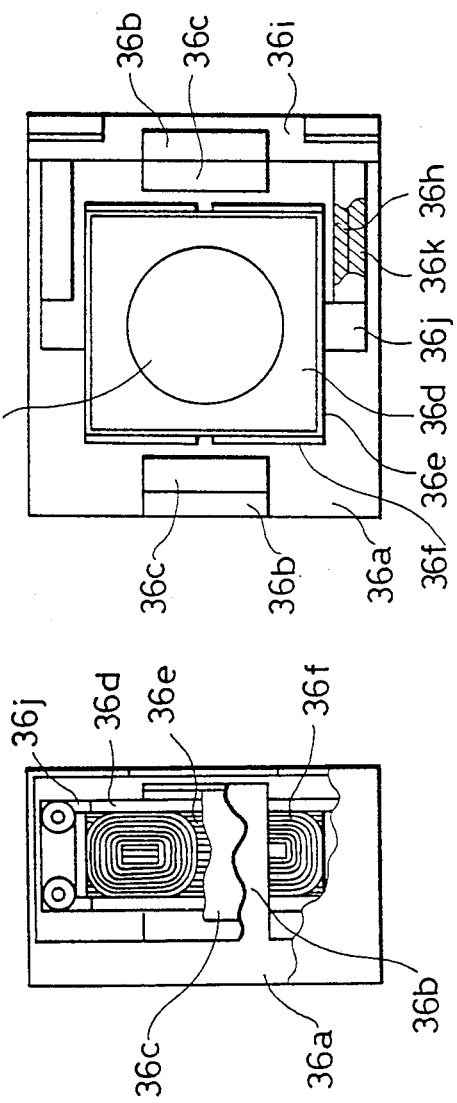

FIG. 9

MAGNETO-OPTICAL HEAD A
RECORDING AREA Ra (GROUP 1)

| t\s | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 3 | 0 | | | | | | | | | | | | | | | | |
| 4 | 17 | 18 | 19 | 20 | 21 | 22 | 23 | 24 | 25 | 26 | 27 | 28 | 29 | 30 | 31 | 32 | 33 |
| 5 | 34 | 35 | 36 | 37 | 38 | 39 | 40 | PD | 41 | 42 | 43 | 44 | 45 | 46 | 47 | 48 | 49 |
| 6 | 50 | 51 | SD | 53 | 54 | 55 | 56 | 57 | 58 | 59 | 60 | 61 | 62 | 63 | 64 | 65 | 66 |
| 7 | 67 | 88 | 69 | 78 | 71 | 72 | 73 | 74 | 75 | 76 | 77 | 78 | 79 | 80 | 81 | 82 | 83 |
| 8 | 84 | 85 | 66 | PD | 87 | 68 | 89 | 91 | 91 | 92 | 93 | 94 | 95 | 96 | 97 | 98 | 99 |
| 9 | 100 | 101 | 102 | 103 | 104 | 105 | 106 | 107 | 108 | 109 | 110 | 111 | 112 | 113 | 114 | 115 | 116 |
| 10 | SD | 118 | 119 | 120 | 121 | 122 | 123 | 124 | 125 | 126 | 127 | | 112 | 52 | 90 | 112 | |
| 11 | | | | | | | | | | | | | | | | | |
| 12 | | | | | | | | | | | | | | | | | |

CONTINUOUS DATA D d1 d2 d3 d4 d5 d6 d7

MAGNETO-OPTICAL HEAD B
RECORDING AREA Rb (GROUP 2)

| t\s | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| n | 0 | | | | | | | | | | | | | | | | |
| n+1 | 17 | 18 | 19 | 20 | 21 | 22 | 23 | 24 | 25 | 26 | 27 | 28 | 29 | 30 | 31 | 32 | |
| n+2 | 33 | 34 | 35 | 36 | 37 | 38 | 39 | 40 | 41 | 42 | 43 | 44 | 45 | 46 | 47 | PD | 49 |
| n+3 | 50 | 51 | 52 | 53 | 54 | 55 | 56 | 57 | 58 | 59 | 60 | 61 | SD | 63 | 64 | 65 | 66 |
| n+4 | 67 | 68 | 69 | 70 | 71 | 72 | 73 | 74 | 75 | PD | 76 | 78 | 79 | 80 | 81 | 82 | 83 |
| n+5 | 84 | 85 | 88 | 87 | 88 | 89 | 90 | 91 | PD | 92 | 93 | 94 | SD | 96 | 97 | 98 | 99 |
| n+6 | 100 | 101 | 102 | 103 | 104 | 105 | 106 | 107 | 108 | 109 | 110 | PD | 111 | 112 | 113 | 114 | 115 |
| n+7 | 116 | 117 | 118 | 119 | 120 | 121 | 122 | 123 | SD | 125 | 126 | 127 | | 62 | 124 | | |
| n+8 | | | | | | | | | | | | | | | | | |
| n+9 | | | | | | | | | | | | | | | | | |

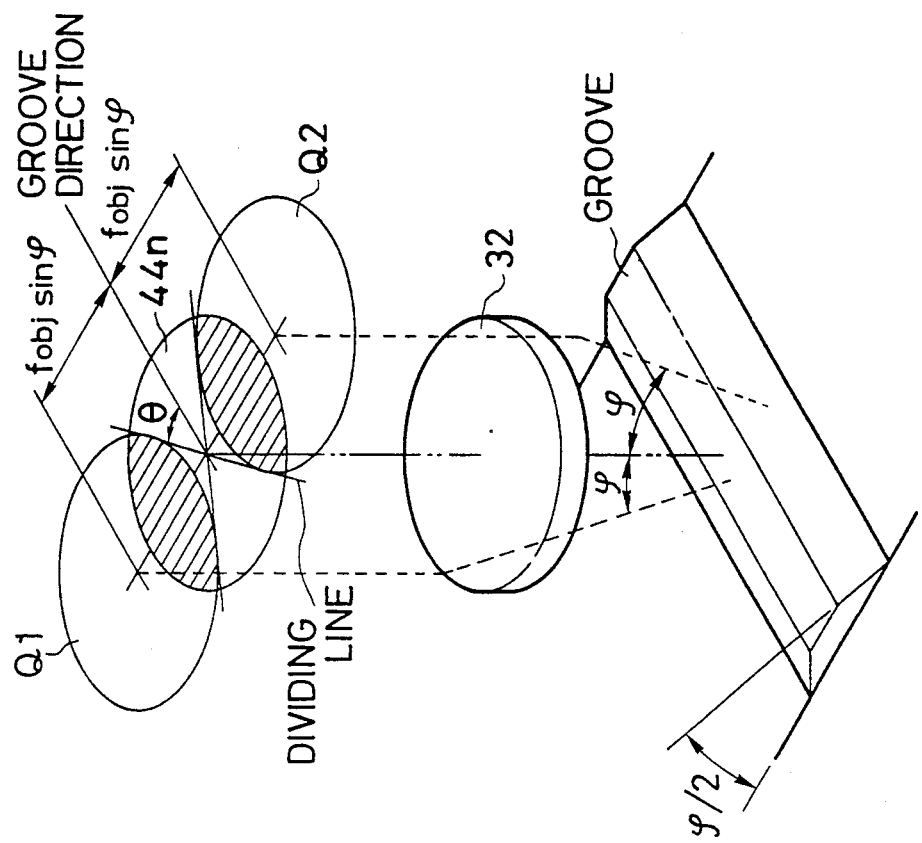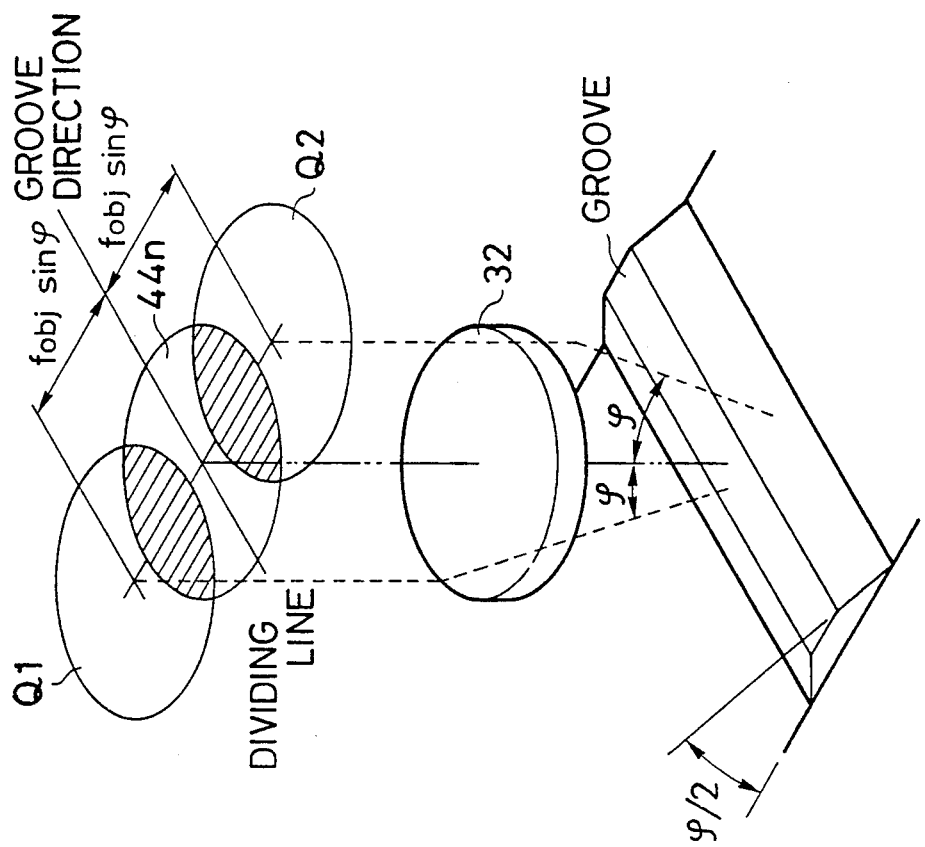

MAGNETO-OPTICAL DISK DEVICE HAVING A PLURALITY OF INDEPENDENTLY MOVING MAGNETO-OPTICAL HEADS IN THE HEAD WINDOW

BACKGROUND OF THE INVENTION

This invention relates to a magneto-optical disk device using a magneto-optical disk cartridge.

The magneto-optical disk device is a memory device having large memory capacities as is the conventional write once optical disk device, and can perform rewriting and erasure of information the conventional write once optical disk device cannot do. Recently various products of magneto-optical disk devices are available. The magneto-optical disk technology is about to reach the production stage, leaving the experimental stage.

In accordance with such development of the magneto-optical disk technology, ISO (International Standardization Organization) standards of the magneto-optical disk was reviewed, and ISO standards for the 130 mm (5.25 inch)-disk cartridge were established.

The 5-inch magneto-optical disk cartridge is easy to replace the disk, and is easy to handle because its recording surface is protected. The cartridge can have a recording capacity hundreds times that of the high density-floppy disk although the cartridge is small-sized. Thus, the 5-inch magneto-optical disk is expected to dominate the future magneto-optical disk medium.

Thus, the magneto-optical disk is much expected to be a large-capacity memory device for the next generation. But a problem with the magneto-optical disk is that much time is taken to read and write data because the device has a large number of tracks and deals with a large volume of data. Accordingly it is a very significant technical problem with the magneto-optical disk device how to record and reproduce a large volume of data at high speed.

To record and reproduce a large volume of data at high speed it can be proposed to rotate the magneto-optical disk at higher speed. But in view of the mechanical properties of the actuator it is difficult to rotate the magneto-optical disk at a high speed more than two times the conventional speed. What is desired is to increase a number of the magneto-optical head for reading and writing data. But the standardized magneto-optical disk cartridge has one head window for one magneto-optical head. It is structurally very difficult to accommodate a plurality of large magneto-optical heads in the small head window.

The magneto-optical disk device has a very large number of tracks and a narrow track pitch. Accordingly tracking servo drive of very high precision is necessary.

SUMMARY OF THE INVENTION

An object of this invention is to provide a magneto-optical disk device which can accommodate a plurality of magneto-optical heads in the head window of a standardized magneto-optical disk cartridge, whereby a large volume of data can be processed at high speed.

Another object of this invention is to provide a magneto-optical disk device which can transmit, and read and write a large volume of data, and perform accurate tracking servo operation.

The above-described objects of this invention are achieved by a magneto-optical disk device in which data are written and read in and from a magneto-optical disk housed in a magneto-optical disk cartridge having a head window of a predetermined shape, the magneto-optical disk device comprising: first and second magneto-optical heads disposed so as to locate in the head window for accessing the magneto-optical disk; driving means for driving the first and second magneto-optical heads to move independently of each other; and control means for controlling the first magneto-optical head to write and read data in and from a first area of the magneto-optical disk and controlling the second magneto-optical head to write and read data in and from a second area of the magneto-optical disk.

The above-described objects of this invention is also achieved by a magneto-optical disk device in which data are written and read in and from a magneto-optical disk housed in a magneto-optical disk cartridge having a head window of a predetermined shape, the magneto-optical disk device comprising: first and second magneto-optical heads disposed so as to locate in the head window for accessing the magneto-optical disk; a center rail disposed substantially at the center of the window head along a diameter of the magneto-optical disk; a first side rail and a second side rail which are disposed parallelly with each other on both sides of the center rail; a first carriage slidably disposed between the center rail and the first side rail, and having at least a part of the first magneto-optical head mounted thereon; first driving means for driving the first carriage along the center rail; a second carriage slidably disposed between the center rail and the second side rail, and having at least a part of the second magneto-optical head mounted thereon; and second driving means for driving the second carriage along the center rail.

The above-described objects of this invention are attained by a magneto-optical disk device in which data are written and read in and from a magneto-optical disk housed in a magneto-optical disk cartridge having a head window of a predetermined shape, the magneto-optical disk device comprising: first and second magneto-optical heads for accessing the magneto-optical disk disposed so as to locate in the head window; a first quadrant photodetector for detecting tracking errors of the first magneto-optical head, dividing lines of the first quadrant photodetector being slanted by a set angle so that the dividing lines substantially agree with a track direction of the magneto-optical disk in a recording area of the magneto-optical disk accessed by the first magneto-optical head; and a second quadrant photodetector for detecting tracking errors of the second magneto-optical head, dividing lines of the second quadrant photodetector being slanted by a set angle so that the dividing lines substantially agree with a track direction of the magneto-optical disk in a recording area of the magneto-optical disk accessed by the second magneto-optical head.

The above-described objects of this invention are attained by a magneto-optical disk device in which data are written and read in and from a magneto-optical disk housed in a magneto-optical disk cartridge having a head window of a predetermined shape, the magneto-optical disk device comprising: first and second magneto-optical heads for accessing the magneto-optical disk disposed so as to locate in the head window; a first tracking coil for driving a first objective of the first magneto-optical head in a direction perpendicular to a track direction of the magneto-optical disk, an axes of the first tracking coil being slanted by a set angle so that a drive direction of the first tracking coil is substantially perpendicular to the track direction in a recording area of the magneto-optical disk accessed by the first magneto-optical head; and a second tracking coil for driving a second objective of the second magneto-optical head in a direction perpendicular to a track direction of the magneto-optical disk, an axes of the second tracking coil being slanted by a set angle so that a drive direction of the second tracking coil is substantially perpendicular to the track direction in a recording area of the magneto-optical disk accessed by the second magneto-optical head.

According to this invention, a plurality of magneto-optical heads are accommodated in the head window of a standardized magneto-optical disk cartridge, whereby a large volume of data can be processed, and read and written at high speed.

Furthermore, in the device according to this invention, with the center rail as the standard, two magneto-optical heads are driven along one center rail. Consequently it is easy to fabricate and adjust the device, maintaining the accuracy of the relative positional relationships between two independently movable carriages accurate.

Furthermore, according to this invention, a large volume of data can be transmitted, and written and read at high speed.

BRIEF DESCRIPTION OF THE DRAWINGS

FIGS. 5A to 5D are views detailing the actuators of the magneto-optical disk device of FIG. 1;

FIG. 9 is a view detailing the recording area which has data recorded of the magneto-optical disk used in the magneto-optical disk device of FIG. 1;

FIGS. 11A and 11B are views explaining the push-pull method used in the magneto-optical disk device of FIG. 1;

DETAILED DESCRIPTION OF THE INVENTION

Figure 1:
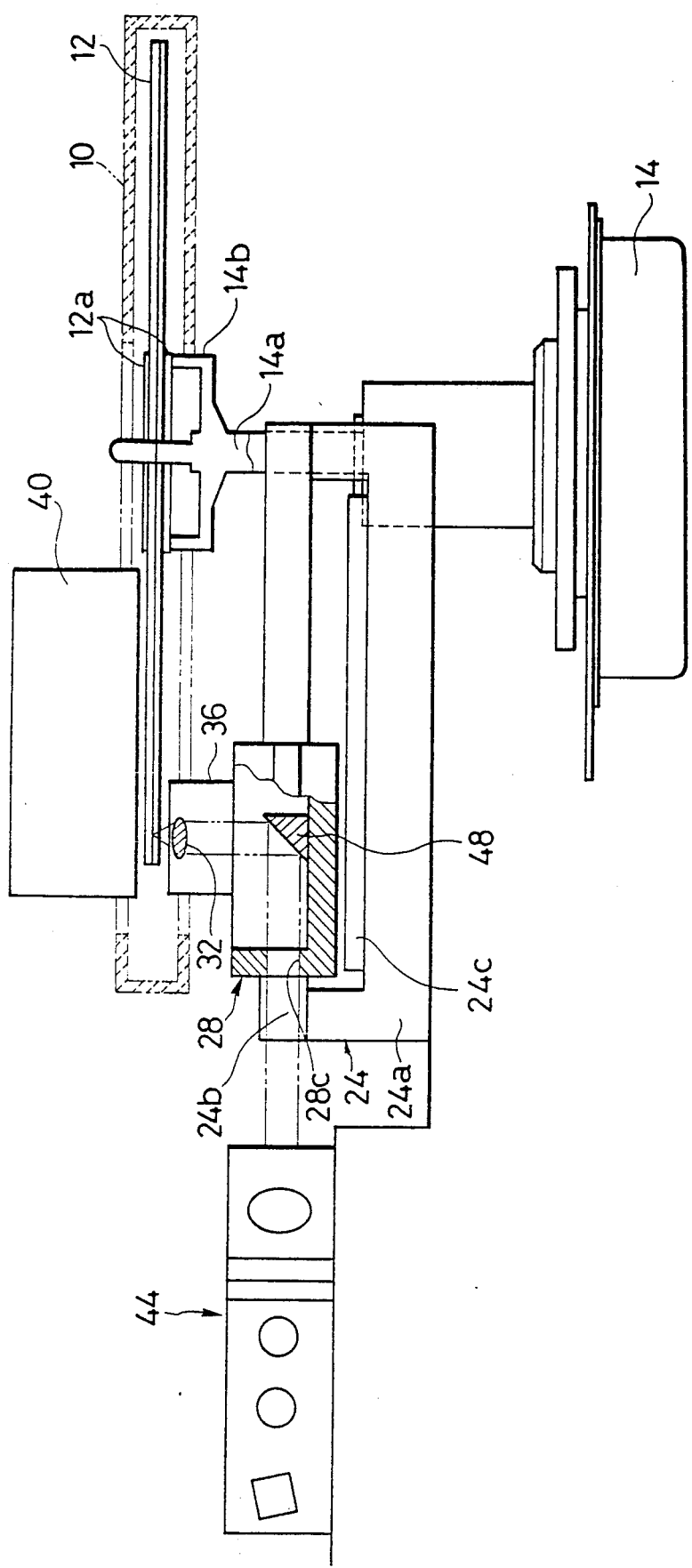
FIG. 1 is a front view of the magneto-optical disk device according to one embodiment of this invention.
Figure 2:
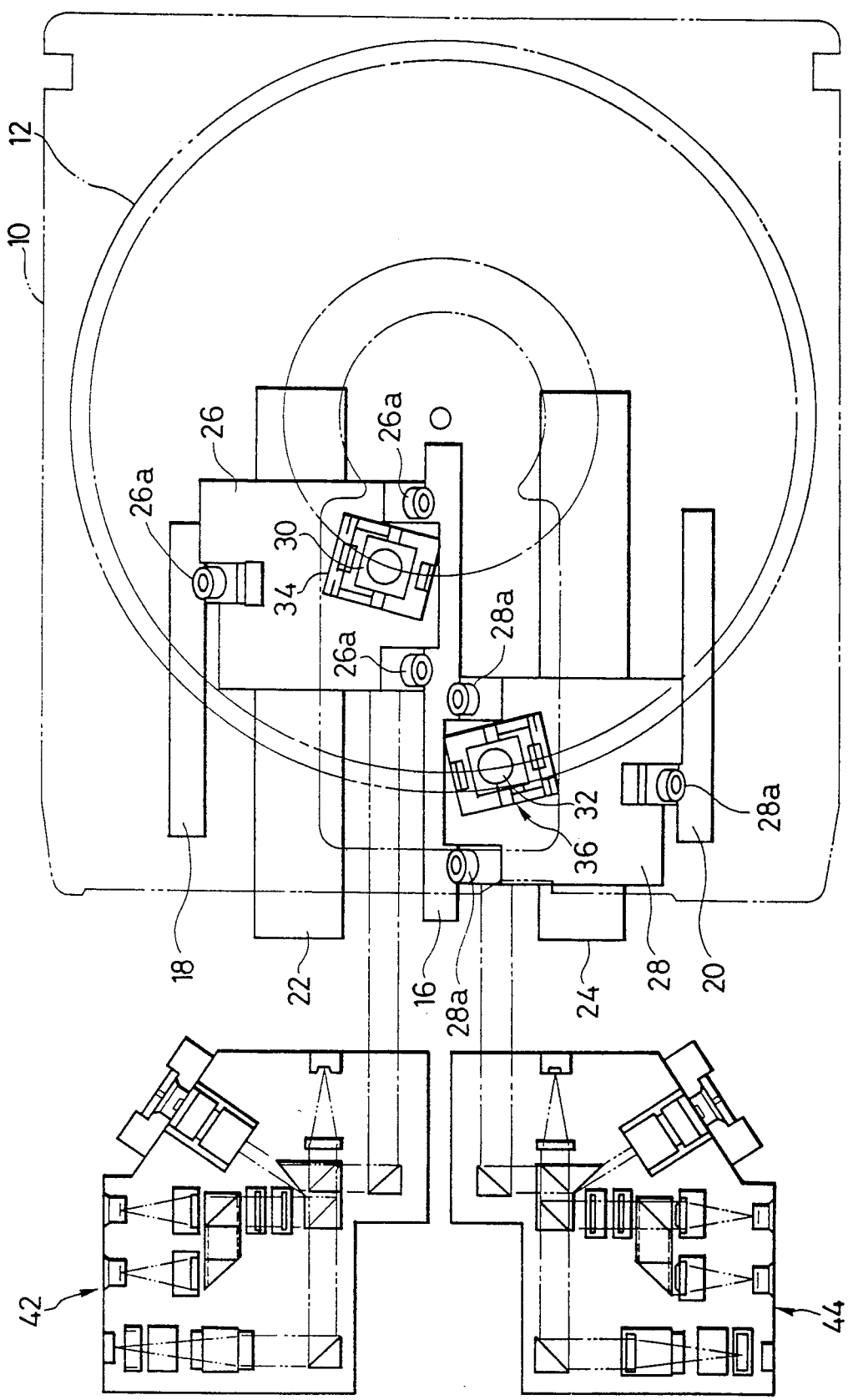
FIG. 2 is a plan view of the magneto-optical disk device of FIG. 1.
Figure 3:
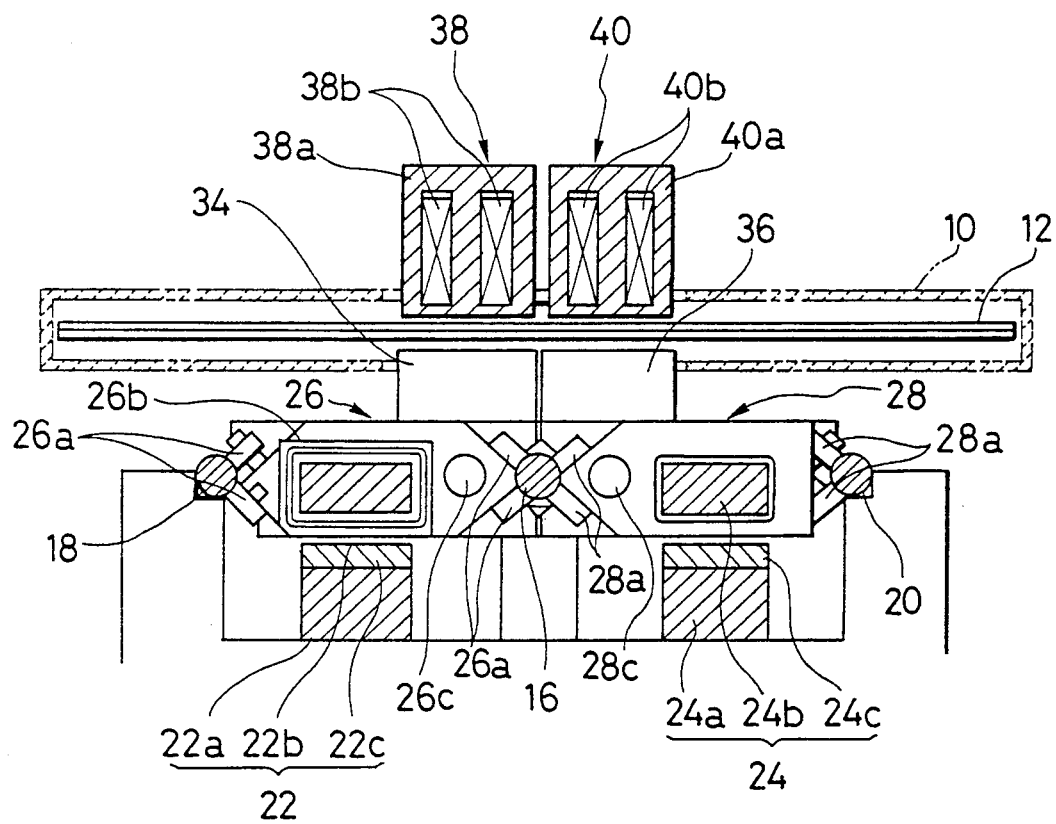
FIG. 3 is a sectional view of the magneto-optical disk device of FIG. 1.

The magneto-optical disk device according to one embodiment of this invention will be explained with reference to FIGS. 1 to 3. FIG. 1 is a front view of the magneto-optical disk device. FIG. 2 is a plan view of the magneto-optical disk device. FIG. 3 is a sectional view of the magneto-optical disk device.

Figure 4:
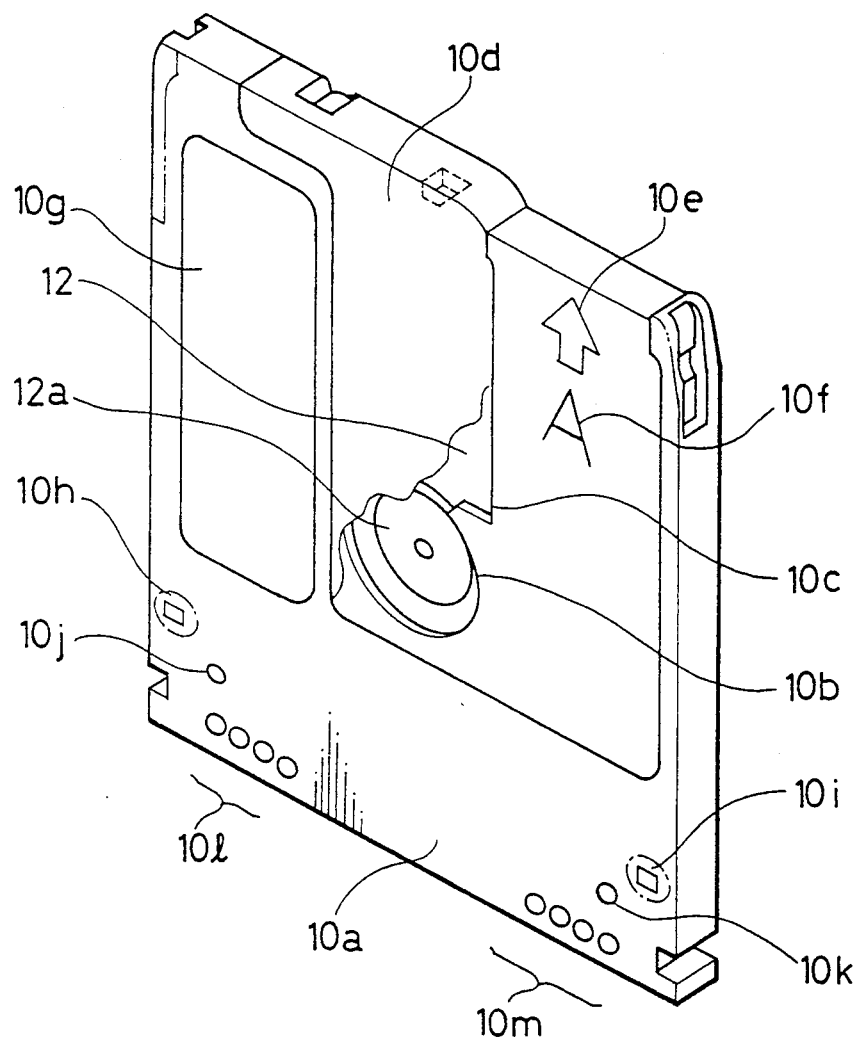
FIG. 4 is a perspective view of an ISO standards 5-inch disk cartridge which is used in the magneto-optical disk device of FIG. 1.

Before the magneto-optical disk device according to this embodiment is explained, the ISO standards 5-inch disk cartridge will be explained with reference to FIG. 4.

A disk cartridge 10 protects a 130 mm (5.25 inch) magneto-optical disk 12 as a recording medium, and facilitates its replacement. A case 10a for the disk cartridge 10 is quadrangle and houses the magneto-optical disk 12. Circular motor windows 10 are opened in the portions of both sides of the case 10a corresponding to a hub 12a of the magneto-optical disk 12. Rectangular head windows 10c are opened continuous with the motor windows 10b in portions of the case 10a corresponding to the recording surfaces of the magneto-optical disk 12 for reading and writing data. The minimum width of the head window 10c is standardized to be 40 mm.

A shutter 10d which is slidable along the sides of the case 10a opens and closes the motor windows 10b and the head windows 10c. When the cartridge is not mounted, the shutter 10d covers the motor windows 10b and the head windows 10c for the protection of the recording surfaces of the magneto-optical disk 12. When the cartridge is mounted, the shutters 10d slide to open the motor windows 10b and the head windows 10c to rotatably support the magneto-optical disk 12 and make the magneto-optical disk 12 ready for reading and writing data in and from the same.

Since the magneto-optical disk 12 has recording surfaces on the front and the back sides, the case 10a for the disk cartridge 10 bears arrows 10e indicating inserting directions and letters 10f ("A", "B") identifying the front and the back sides of the case 10a. Label regions 10g are provided on both sides of the case 10a next to the motor windows 10b and the head windows 10c.

In the lower portion of the case 10a there are formed an alignment hole 10h, a location hole 10i, an A-side write protection hole 10j, a B-side write protection hole 10k, an A-side medium identification hole 10l, and a B-side medium identification hole 10m.

Next the magneto-optical disk device according to this embodiment will be explained. In FIGS. 1 to 3, the magneto-optical disk device with the above-described disk cartridge 10 mounted will be explained.

A clamp table 14b is formed on the forward end of a rotary shaft 14a of a spindle motor 14. A hub 12a of the magneto-optical disk 12 housed in a disk cartridge 10 is clamped by the clamp table 14b. In this embodiment, the spindle motor 14 rotates a magneto-optical disk at 1800 rpm.

Below the magneto-optical disk 12 there are provided a center rail 16 at the center, and side rails 18, 20 on both sides of the center rail 16. Linear motors 22, 24 are provided respectively between the side rail 18 and the center rail 16 and between the center rail 16 and the side rail 20. Each linear motors 22, 24 comprises a bracket-shaped lower yoke 22a, 24a, upper yoke 22b, 24b disposed on the lower yoke 22a, 24a, and flat magnet 22c, 24c disposed on the inside bottom of the lower yoke 22a, 24a, and thus constitute a magnetic circuit.

There are provided two carriages 26, 28 corresponding to the two linear motors 22, 24.

The carriage 26 is disposed between the center rail 16 and the side rail 18, and slidably supported by two pairs of two bearings 26a on the center rail 16 and also slidably by a pair of two bearings on the side rail 18. The bearings 26a are preloaded so as not to be displaced upon sliding. In the center of the carriage 26 there is formed a square-sectional hole. The upper yoke 22b of the linear motor 22 is passed through the hole, and a coil 26b is inserted along the inside surface of the hole.

The carriage 28 is disposed between the center rail 16 and the side rail 20, and slidably supported by two pairs of two bearings 28a on the center rail 16 and also slidably by one pair of two bearings on the side rail 20. The bearings 28a are preloaded so as not to be displaced upon sliding. A square sectional opening is formed in the center of the carriage 28, and the upper yoke 24b of the linear motor 24 is passed through the hole. A coil (not shown) is inserted along the inside surface of the hole.

On these carriages 26, 28 there are mounted objectives 30, 32 which are components of magneto-optical heads and which are essentially necessary parts for reading and writing data, and their actuators 34, 36. These actuators 34, 36 are mounted nearer to the center rail 16 so as to be accommodated in the 40 mm-width head window 10c.

Bias magnets 38, 40 are disposed above the magneto-optical disk 12 for applying bias magnetic fields to positions corresponding to moving areas of the actuators 34, 36. Each bias magnet 38, 40 comprises an E-shaped sectional yoke 38a, 40a, and a coil 38b, 40b. These bias magnets 38, 40 are arranged nearer to the center rail 16 so as to be accommodated in the head window 10c of the disk cartridge 10.

Laser beams (two-dot chain lines) from optical systems 42, 44 pass through holes 26c, 28c formed in the carriages 26, 28 and are led to objectives 30, 32 by mirrors 46, 48 (the mirror 46 is not shown) to be converged onto a recording surface of the magneto-optical disk 12. The laser beams reflected against the recording surface of the magneto-optical disk 12 are led by the mirrors 46, 48 (the mirror 46 is not shown) by way of the objectives 30, 32 and through holes 26c, 28c to the optical systems 42, 44.

Thus, in this embodiment, only the objectives 30, 32 and their actuators 34, 36, which are minimumly essential, are mounted on the carriages separately from the optical systems 42, 44 for the weight reduction of the device. As a result a load to the linear motors 22, 24 can be reduced, and an access time can be shortened.

Only the objectives 30, 32, and the actuators 34, 36, which are minimumly essential, are mounted on the carriages 26, 28 for the miniaturization of the device. The carriages 26, 28 share one of the rails to slide along, or the center rail 16. Consequently two magneto-optical heads can be accommodated in the head window 10c having a limited width of 40 mm.

Furthermore, by setting the center rail 16 shared by the two magneto-optical heads set as the standard it is possible to easily fabricate and adjust the device, maintaining the relative positional relationship between the independently movable carriages 26, 28.

Next, the structure of the actuator 36 will be explained with reference to FIGS. 5A to 5D. FIG. 5A is a front view of the actuator 36, FIG. 5B is a plan view of the actuator 36, FIG. 5C is a side view of the actuator 36, and FIG. 5D is a sectional view of the actuator 36. The actuator 34 has the same structure, and its explanation is omitted.

An actuator base 36a is provided as the base of the actuator 36. Two yokes 36b are formed in one-piece with the actuator base 36a to extend vertically upward therefrom. A magnet 36c is attached to the inner side of each yoke 36b. The actuator base 36a, the yoke 36b and the magnet 36c make up a magnetic circuit.

The objective 32, which is driven by the actuator 36a, is supported by a coil bobbin 36d. On the coil bobbin 36d there are provided a focussing coil 36e for generating a drive force in the direction of the optical axis, and a tracking coil 36f for generating a drive force in the direction perpendicular to a tracking direction perpendicular to the optical axis. A counterweight 36g is attached to the side of the coil bobbin 36d opposite to the objective 32 for compensating the weight.

The coil bobbin 36d is movably supported by four suspension wires 36h. A wire locking portion 36i is extended vertically upward from one side of the actuator base 36a. A bobbin locking portion 36j is formed in one side of the coil bobbin 36d. The bobbin locking portions 36i and 36j are interconnected by a suspension wire 36h buried in the rubber damper 36k so that the coil bobbin 36d is supported movably in all directions.

The entire actuator 36 is covered protectively with a cover 36l having a hole formed in the portion above the objective 32.

The coil bobbin 36d is driven in the direction of the optical axis in accordance with a current flowing through the focussing coil 36e, and the coil bobbin 36d is driven in the direction of a track in accordance with a current flowing through the tracking coil 36f.

Figure 6:
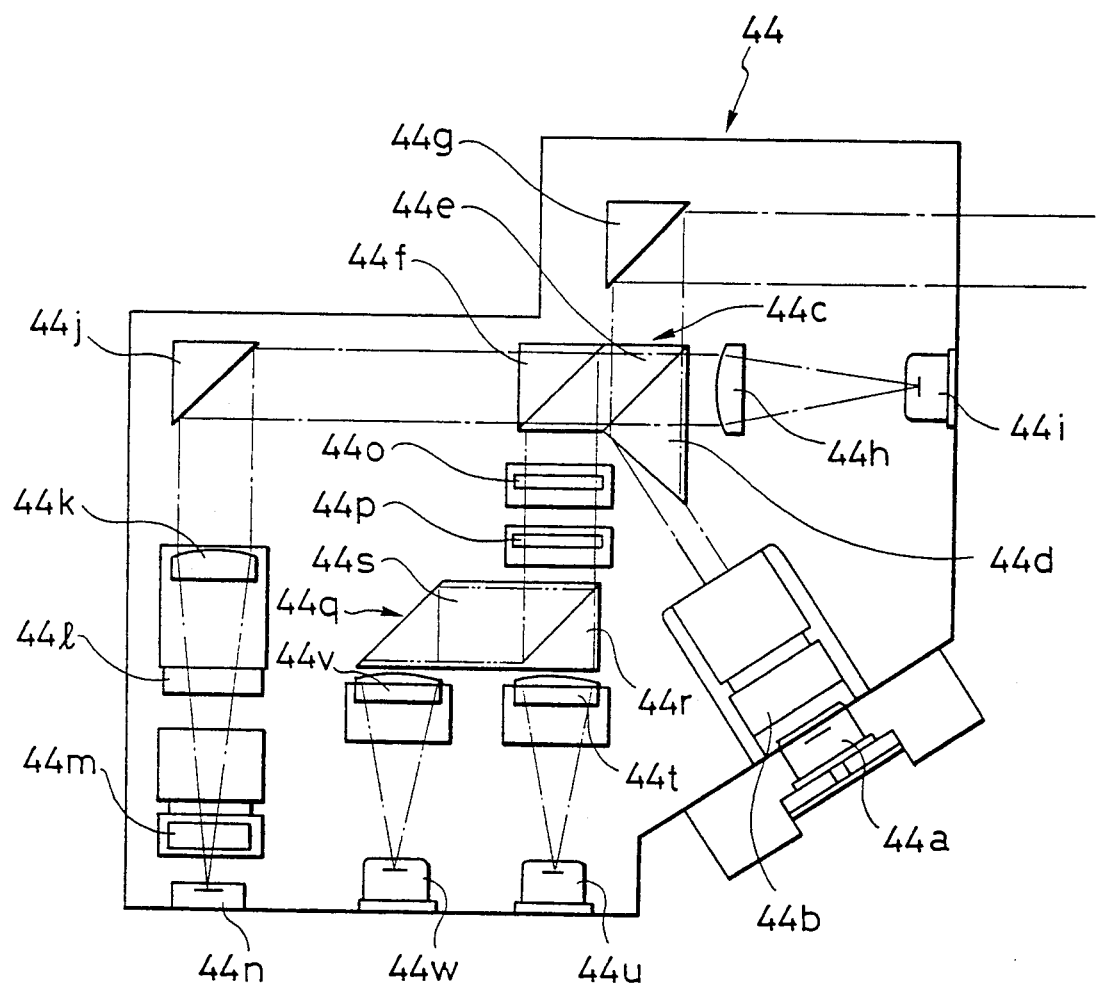
FIG. 6 is a view detailing the optical system of the magneto-optical disk device of FIG. 1.

Next, the structure of an optical system 44 will be explained in detail with reference to the enlarged view of FIG. 6. An optical system 42 will not be explained, because the optical system 42 has the same structure as the optical system 44 except that the optical system 42 is positioned symmetrically with the optical system 44.

A laser beam emitted from a laser diode 44a which is the beam source is converted from divergent rays into parallel rays by a collimator lens 44b. The laser beam which has been converted into parallel rays is incident on a compound prism 44c. The compound prism 44c comprises a beam shaping prism 44d and two beam splitting prisms 44e, 44f. The incident laser beam has the intensity distribution in section of the parallel laser rays shaped and is split into two laser beams by the beam splitting prism 44e. The laser beam which has advanced straight through the beam splitting prism 44e has the optical path changed orthogonally by a mirror 44g and is led toward the above-described actuator 36 to be incident on the magneto-optical disk 12 by way of the mirror 48 and the objective 32.

On the other hand, the laser beam reflected on the beam splitting prism 44e is led by a plano-convex lens 44h to a PIN photodiode 44i. The PIN photodiode 44i detects the intensity of the laser beam outputted from the laser diode 44a, and the detected signal is fed back for the control of the intensity of the laser diode 44a.

The reflected beam on the magneto-optical disk 12 is led toward the optical system 44 by way of the objective 32 and the mirror 48. Then the reflected beam has the optical path changed perpendicularly to enter the compound prism 44c. The laser beam reflected on the beam splitting prism 44e is split into two laser beams by the beam splitting prism 44f.

The laser beam which has advanced straight through the beam splitting prism 44f has the optical path bent perpendicularly by a mirror 44j. The laser beam which has been bent perpendicularly is converged by a plano-convex lens 44k and a cylindrical lens 44l to be converged onto a quadrant photodetector 44n by way of a plano-concave lens 44m. The quadrant photodetector 44n detects focussing errors and tracking errors. A plano-concave lens 44m is disposed immediately before the quadrant photodetector 44n is for raising the magnification of the above-described astigmatism.

On the other hand, the laser beam reflected on the beam splitting prism 44f is incident on a polarized beam splitter 44q through a ¼ wave plate 44o, and a ½ wave plate 44p. The ¼ wave plate performs phase compensation of the optical components, and the ½ wave plate 44p rotates the plane of polarization by 45 degrees.

The polarized beam splitter 44q comprises two prisms 44r, 44s and is for converting a rotation of the plane of polarization into an intensity change by Kerr effect. The polarized beam splitter 44q transmits a component p and reflects component s. The transmitted a component p is converged on a PIN photodiode 44u by the plano-convex lens 44t. The reflected component s is converged on a PIN photodiode 44w by the plano-convex lens 44v. Based on detected signals from the PIN photodiodes 44u, 44w, rotational directions due to Kerr effect are detected, and, based on magnetization directions recorded in the magneto-optical disk 12, recorded information is read.

In the magneto-optical disk device according to this embodiment, two magneto-optical heads are provided in the 40 mm-width head window 10c of a magneto-optical disk cartridge 10 according to the ISO standards. The two magneto-optical heads are controlled to efficiently write and read information, whereby a large volume of data can be transmitted at high speed.

The control of the magneto-optical heads involved in this embodiment will be explained in detail with reference to FIGS. 7 to 9.

Figure 7:
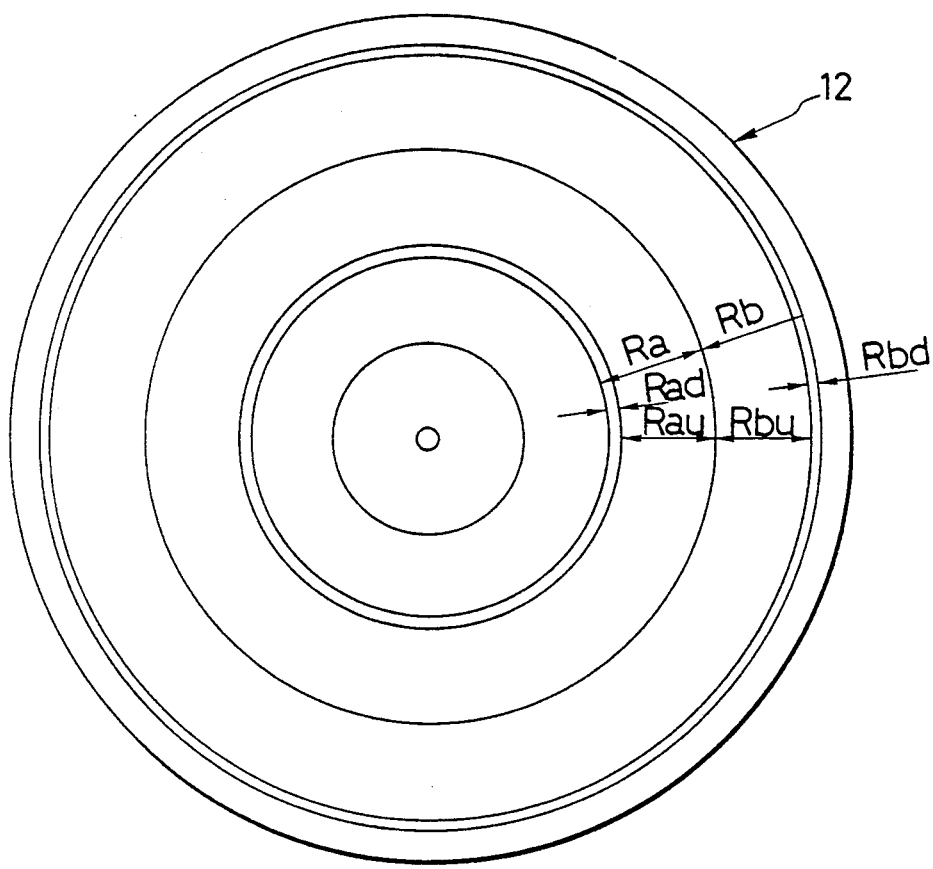
FIGS. 7 and 8 are views detailing the recording area of the magneto-optical disk used in the magneto-optical disk device of FIG. 1.
Figure 8:
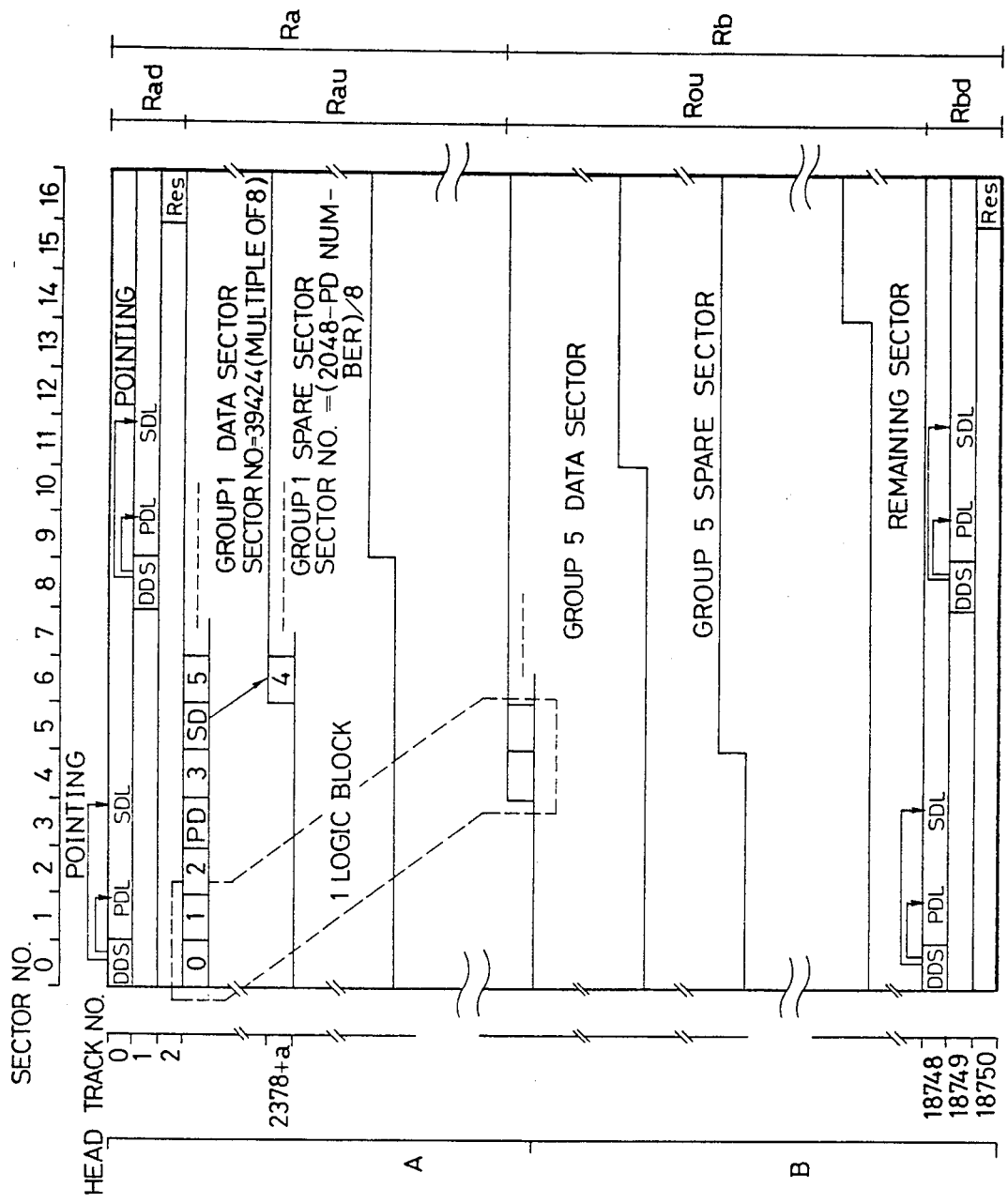

As shown in FIG. 7, an entire recording area of the magneto-optical disk 12 is divided in two recording areas, a recording area Ra on the inner circumferential side, and a recording area Rb on the outer circumferential side. The recording area Ra on the inner circumferential side is accessed by a magneto-optical head A, and the recording area Rb on the outer circumferential side is accessed by an magneto-optical head B. The actuator 34 for the magneto-optical head A is mounted on the center rail 16, and the carriage 26 on the upper side of FIG. 2. The actuator 36 for the magneto-optical head B is mounted on the center rail 16, and the side rail 20 on the lower side of FIG. 2.

On the innermost circumference of the recording area Ra there is provided a DMA (Defect Management Area) Rad for managing defective sectors. A DMA Rbd is also provided on the outermost circumference of the recording area Rb. The remainder of the recording area Ra is a user's area Rau, and the remainder of the recording region Rb is a user's area Rbu.

The magneto-optical disk 1 has 18751 tracks from the 0th track to the 19750th track. Each track has 17 sectors from the 0th sector to the 16th sector.

The DMA Rad of the recording area Ea occupies three tracks from the 0th track to the 2nd track. The 0th, the 0th sector is a recording area for DDS (Disk Definition Structure). Information of the structure of the magneto-optical disk 12 is recorded there. The 0th, the 1st sector to the 1st track, the seventh sector is a recording area for PDL (Primary Defect List) and SDL (Secondary Defect List). The PDL is a list of sectors having primary defects PD (Primary Defect). The SDL is a list of sectors having secondary defects SD (Secondary Defect) detected upon actually writing and reading the magneto-optical disk 12. The 1st track, the 8th sector is a recording area for the DDS. The 1st track, the 9th sector to the 2nd track, the 25th sector are recording areas for the PDL and SDL. The final second track, the 16th sector of the DMA area Rad is a reserve sector Res (Reserve).

The DMA area Rbd of the recording area Rb is three-track area from the 18748th track to the 18750th track. As in the DMA region Rad, DDS, PDL and SDl recording areas are provided, and the final sector is a reserve sector.

The user's area Rau of the recording area Ra is divided in groups 1 to 4, and the user's area of the recording area Rb is divided in groups 5 to 8. Each group has data sectors for recording data, and spare sectors for secondary defects (SDs) in the data sectors. When a secondary defect is present in the data sector, data is written in one of the spare sectors in place of the secondary defect sector.

The recording condition in the magneto-optical disk 12 will be explained in detail with reference to FIG. 9 where Group 1 of the recording area Ram and Group 5 of the recording area Rb are exemplified. In FIG. 9 data corresponding to 128 sectors are written in each of Group 1 and Group 5.

When a primary defect is detected in the formating operation, the primary defective sector PD is expelled from the logic space to be processed as if it were not present. For example, if the 7th sector of the 5th track is a primary defect sector PD, data <41> following the data <40> recorded in the 6th sector of the 5th track is recorded in the 8th sector of the 5th track. The information of the primary defect is already recorded in the DMA area Rad as a PDL.

When a secondary defect is detected in an actual reading or writing operation, it is impossible to expel the secondary defect from the logic space, and data is recorded in the spare sector of the same group. For example, if a secondary defect is detected in the 2nd sector of the 6th track, the leading 10th track, the 13th sector of the spare sector is a substitute sector for the secondary defect sector SD, and the data <52> is recorded there. Every time a substitute sector is set for a secondary defect sector SD, the information of the secondary defect sector SD is recorded in the DMA area Rad by the magneto-optical head.

What will be next explained with reference to FIG. 9 is the control means (not shown) for recording continuous data D in some sectors of the magneto-optical disk 12 by the magneto-optical disk device.

Continuous data D to be recorded is divided in data d1, data d2, ... by the unit of a sector capacity. A first data d1 is recorded by one of the magneto-optical heads A in the 6th sector of the 5th track of the recording area Ra (Group 1). A next data d2 is recorded in the 7th sector of the (n+2)th track of the recording area Rb (Group 5) by the other of the magneto-optical head B. Subsequently, a next data d3 is written in the 8th sector of the 5th track skipping a primary defect sector (the 5th track, the 7th sector). A next data d4 is written by the magneto-optical head B in the 8th sector of the (n+2)th track following the 7th sector of the (n+2)th track. Similarly two magneto-optical heads A, B are concurrently used to record the continuous data.

The same continuous data is thus assigned to the two magneto-optical heads A, B for writing, and the recording time is made a half.

When the continuous data D is read from the magneto-optical disk 12, the 6th sector of the 5th track is accessed by the magneto-optical head A, and the data d1 is read. Concurrently therewith the 7th sector of the (n+2)th track is accessed by the magneto-optical head B, and the data d2 is read. Subsequently the 8th sector of the 5th track is accessed by the magneto-optical head A, and the data d3 is read. Concurrently therewith the 8th sector of the (n+2)th track is accessed by the magneto-optical head B, and the data d4 is read. Similarly the data d5, d6, . . . are read by the two magneto-optical heads A, B, and the read data by the magneto-optical heads A, B are arranged alternately into the continuous data D.

The same data is thus read by the two magneto-optical heads A, B to make reading time a half.

Consequently according to this embodiment, it is possible to transmit, and read and write a large volume of data at high speed.

In this embodiment, the spindle motor 14 rotates the magneto-optical disk 12 at 1800 rpm, thus about 500K bytes per a second per one magneto-optical disk can be transmitted. By reading and writing by the two magneto-optical heads A, B, resultantly 1M bytes per a second can be transmitted.

By rotating the spindle motor 14 at higher speed, it is possible to transmit data at higher speed, but in view of mechanical resonance, presently it is difficult to rotate the spindle motor 14 at higher speed more than twice the conventional speed. This embodiment can realize high-speed data transmission which is comparable with that realized by the higher-speed rotation of the spindle motor exceeding the conventional limit, without increasing loads to the objective servo system and the signal processing system.

This invention is not limited to the above-described embodiment and covers various modifications.

For example, although in the above-described embodiment continuous data is divided by a sector to be assigned to the two magneto-optical heads, it is possible to divide the continuous data by optional data volumes without being restricted by a sector, when the continuous data of a plural of sectors can be alloted to the two magneto-optical heads.

In the above-described embodiment, the magneto-optical disk is divided in two recording areas, and each recording area is divided in four groups, but different modes are possible.

In the magneto-optical disk device according to the above-described embodiment, two magneto-optical heads are provided in the 40-mm head window 10c of the magneto-optical disk cartridge 10 according to the ISO standards. Consequently the seek directions of the respective magneto-optical heads do not agree with the diametric direction of the magneto-optical disk 12.

Figure 10:
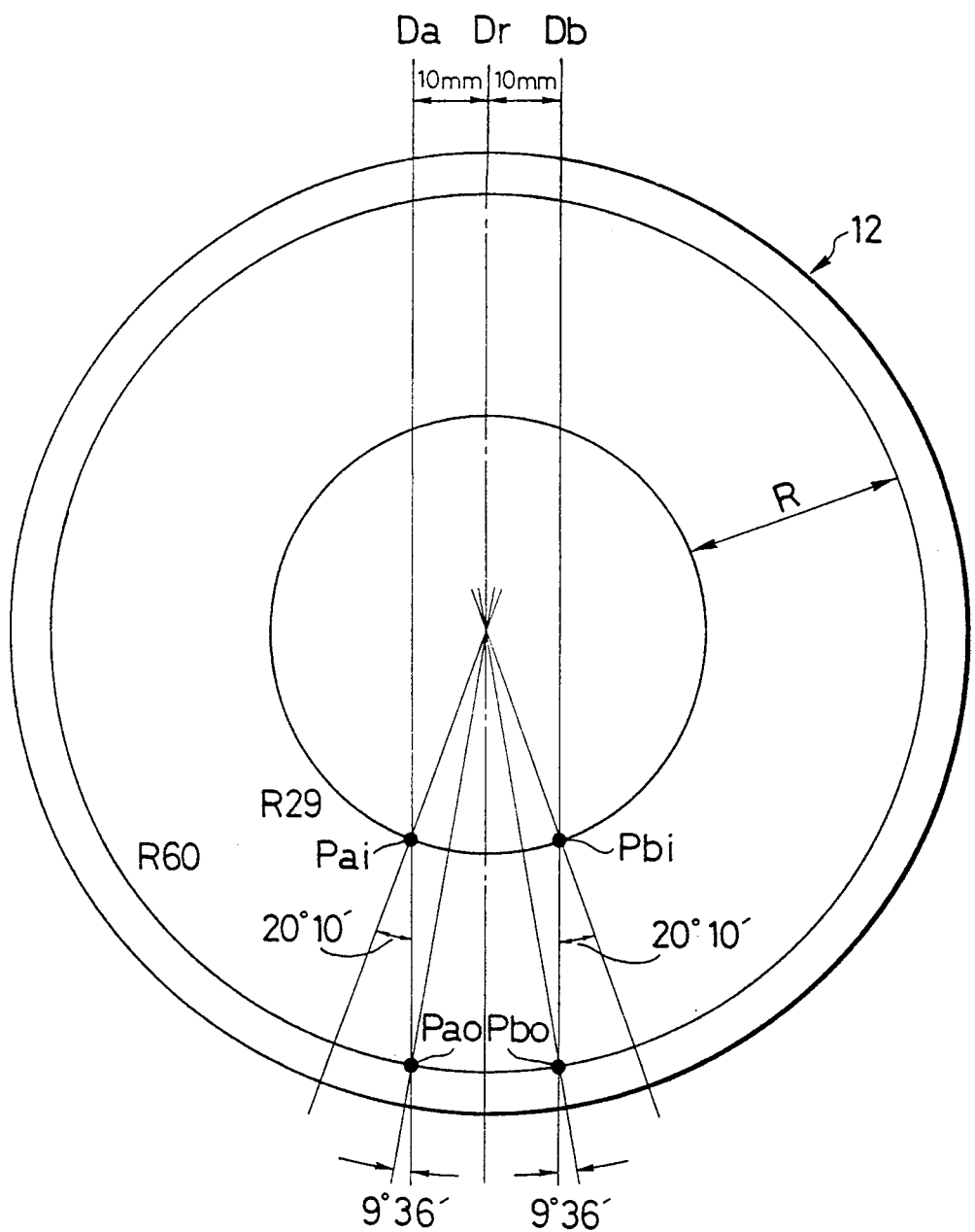
FIG. 10 is a view of an example of the movement of the magneto-optical heads of the magneto-optical disk device of FIG. 1.

The movement of the magneto-optical heads A, B with respect to the magneto-optical disk 12 are schematically shown in FIG. 10. The seek directions Da, Db of the magneto-optical heads A, B with respect to a 5-inch (130 mm) magneto-optical disk 12 are parallel with the diametric direction Dr and displaced to the right and the left by 10 mm. The recording area R of the magneto-optical disk 12 has a 29-mm radius innermost circumference, and a 60-mm radius outermost circumference. The displacement angle $\theta$ of the seek direction Da of the magneto-optical head A is 9°36' at a position Pao on the outermost circumference, and is as large as 20°10' at a position Pai on the innermost circumference. The displacement angle $\theta$ of the seek direction of the magneto-optical head B is 9°36' at a position Pbo on the outermost circumference, and 20°10' at a position Pbi on the innermost circumference.

Such displacement of the seek directions with respect to the diametric direction makes it possible to perform the tracking servo drive accurate. That is, the displacement of the seek directions of the diametric direction result in the following two problems:

1) the dividing lines of the quadrant photodetector 44n for detecting a tracking error signal are displaced, with the result of a lower modulation factor of the tracking error signal; and 2) the directions of the tracking coils 36f of the actuators 34, 36 are displaced, with the result of increases of the jitter amount due to the tracking servo drive.

The above-described embodiment has successfully solved these problems as well and makes it possible to perform accurate tracking servo drive.

Next, these problems and their solutions will be explained in detail.

Firstly, the prevention of decreases of the modulation factor of the tracking error signal due to the inclination of the dividing lines of the quadrant photodetector will be explained.

In this embodiment, the tracking error signal is detected by push-pull method. In the push-pull method, a laser beam is irradiated onto a groove of a magneto-optical disk, and the reflected beams on both sides of the groove are detected by a photodetector which is divided into two parts, whereby a tracking error is detected based on whether or not intensities of the right and the left reflected beams are equal to each other.

For the explanation of the principle of the push-pull method, FIGS. 11A and 11B show the grooves of the magneto-optical disk 12, the objective 32 and the quadrant photodetector 44n with the passages interconnecting them omitted. FIG. 11A shows the case the seek direction Db agrees with the diametric direction Dr. FIG. 11B shows the case the seek direction Db is displaced from the diametric direction Dr.

The reflected beams on the right and the left edges of a groove of the magneto-optical disk 12 are irradiated on the quadrant photodetector 44n. A difference $I_{1\text{-}2}$ ($=I_1-I_2$) between detected signals $I_1$ and $I_2$ based on two diffraction patterns on the quadrant photodetector 44n is divided by an entire intensity $I_0$ ($=I_1+I_2$), and the resultant value $I_{1\text{-}2}/I_0$ is detected as a tracking error signal.

In the case the quadrant photodetector 44n is so arranged as in FIG. 11A that when the seek direction Db agrees with the diametric direction Dr, a dividing line agrees with the groove direction of the magneto-optical disk 12, as shown in FIG. 11B the groove direction and the dividing line direction are displaced from each other by an angle $\theta$ when the seek direction Db and the diametric direction Dr are displaced from each other. Resultantly the modulation factor of the tracking error signal $I_{1\text{-}2}/I_0$ is lowered, and based on this tracking error signal, the tracking servo drive cannot be accurately conducted.

Figure 12A:
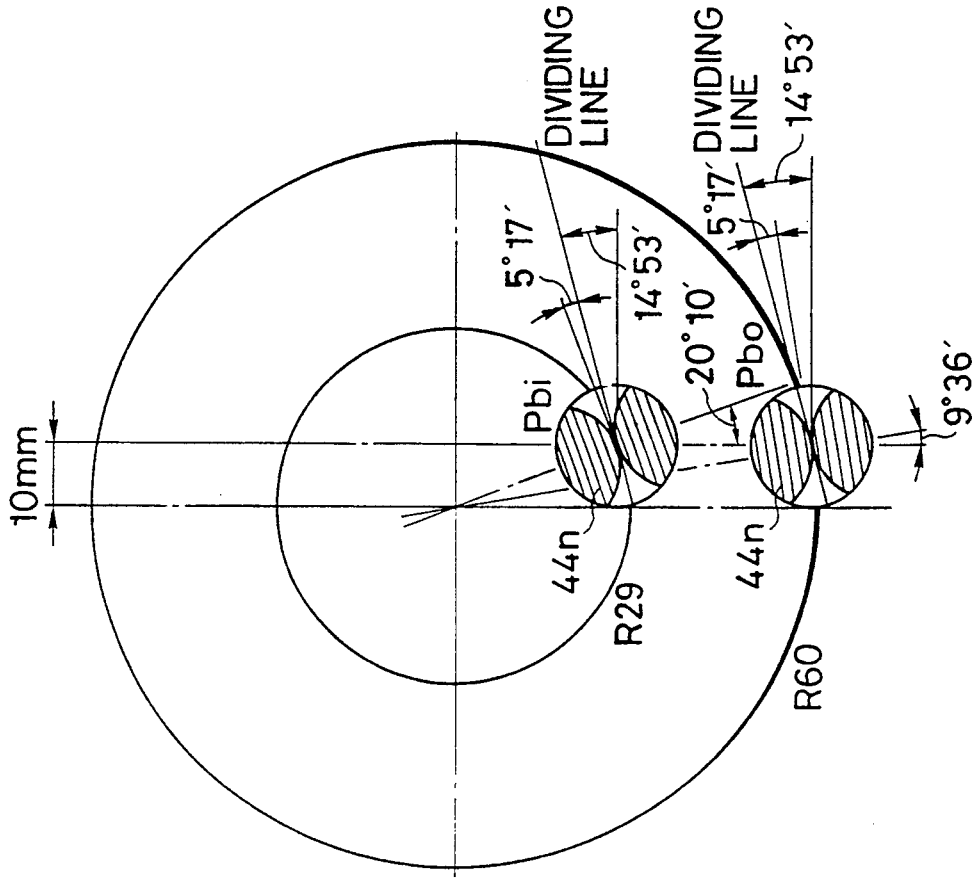
FIGS. 12A and 12B are views explaining the arrangement of the quadrant photodetector in the optical system used in the magneto-optical disk device of FIG. 1.

That is, when the quadrant photodetector 44n is arranged so as to be optimumly positioned when the seek direction Db agrees with the diametric direction Dr, the magneto-optical head B as shown in FIG. 12A has a displacement angle θ of about 9°36' at a position Pbo on the outermost circumference and 20°10' at a position Pbi on the innermost circumference. The diffraction patterns Q1, Q2 overlap each other across a dividing line of the quadrant photodetector 44n, and resultantly the modulation factor of the tracking error signal is lowered.

Figure 12B:
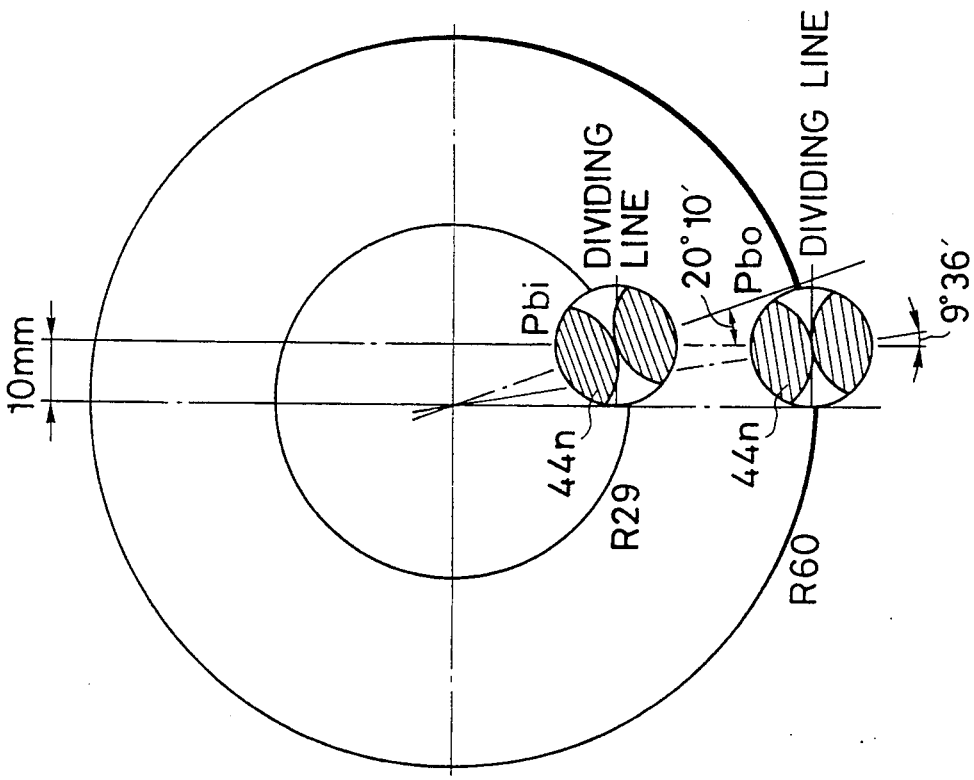

In view of this, in this embodiment, the dividing lines of the quadrant photodetector 44n are slanted from the position in FIG. 12A so that the displacement angle θ does not increase at the position Pbo on the outermost circumference and at the position Pbi on the innermost circumference. Specifically as shown in FIG. 12B, the dividing lines of the quadrant photodetector are slanted by 14°53' (=(9°36'+20°10')/2) from the position in FIG. 12A so that the displacement angle θ becomes equal at the position Pbo on the outermost circumference and at the position Pbi on the innermost circumference. The displacement angle θ is 5°17' at maximum at the position Pbo on the outermost circumference and at the position Pbi on the innermost circumference. The displacement angle θ is smaller than 5°17' in the recording area R between the two positions.

With respect to the magneto-optical head A, the quadrant photodetector is so arranged that the dividing lines are slanted by 14°53' from the position the quadrant photodetector optimumly takes when the seek direction Da agrees with the diametric direction Dr. This arrangement can decrease the displacement angle θ of the magneto-optical head A below 5°17' in the recording area R.

The prevention of increases of the jitter amount due to the inclination of the tracking coils of the actuators will be explained below.

Figure 13B:
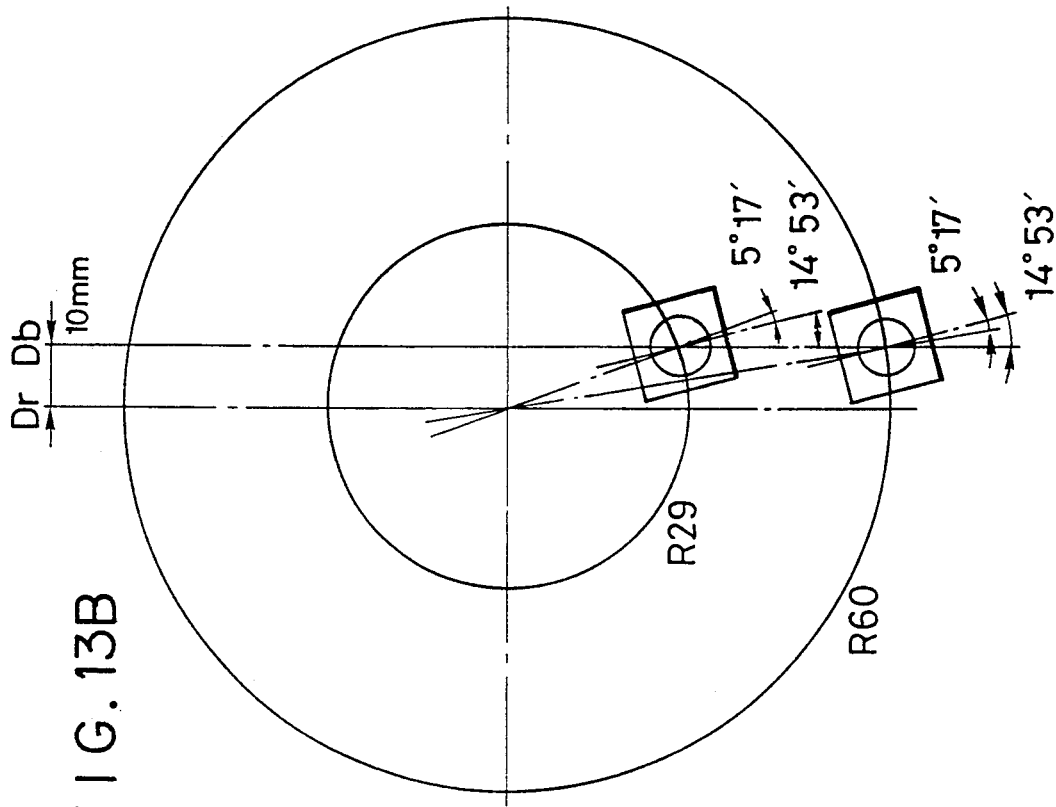
FIGS. 13A and 13B and FIG. 14 are views explaining the arrangement of the actuator used in the magneto-optical disk device of FIG. 1.
Figure 13A:
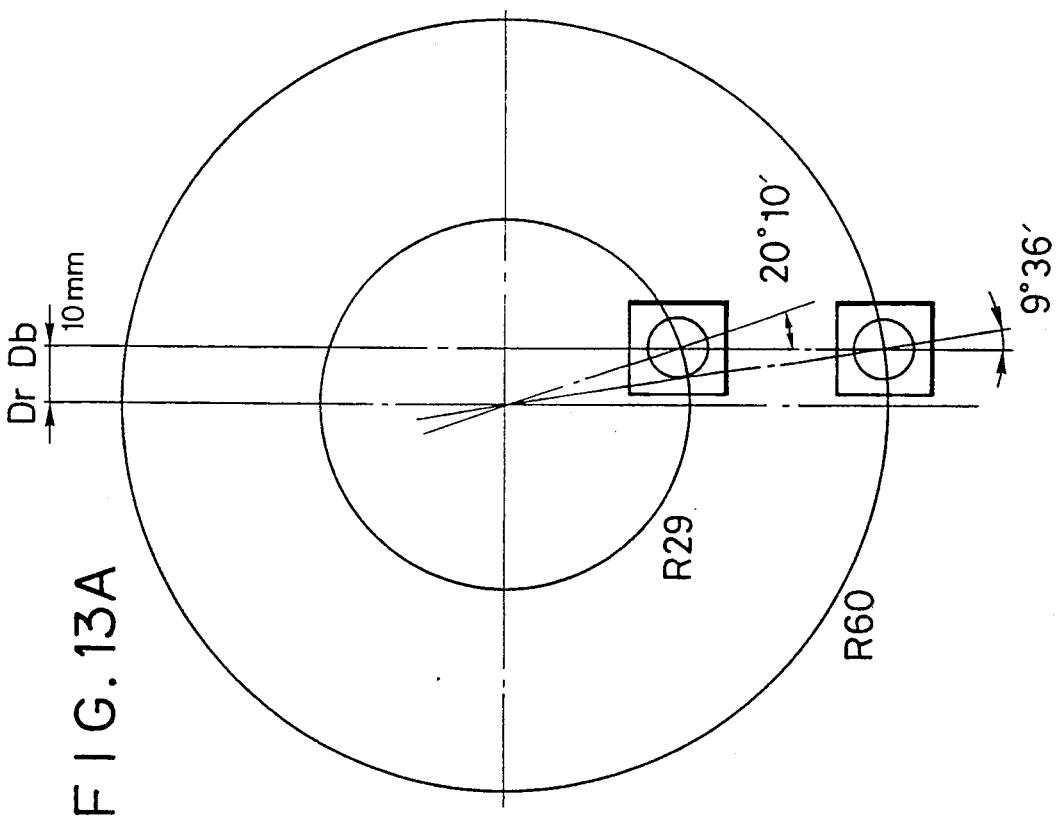

FIGS. 13A and 13B schematically show the tracking coil 36f of the actuator 36 of the magneto-optical head B.

When the tracking coil 36f of the actuator 36 is optimumly positioned when the seek direction Db and the diametric direction Dr agree with each other, as shown in FIG. 13A, the displacement angle at the position Pb on the outermost circumference is about 9°36', and that at the position Pbi on the innermost circumference is as large as 20°10'. When the actuator 36 is driven to cause a current to flow through the tracking coil 36f to remove a tracking error, a component of the force of the tracking coil 36f works also in the diametric direction, generating jitter.

In view of this, in this embodiment, the tracking coil 36f of the actuator 36 is so inclined from the position in FIG. 13A that the displacement angle θ does not increase at the position Pbo on the outermost circumference and that on the innermost circumference. As shown in FIG. 13B the tracking coil 36f is inclined by 14°53' from the position in FIG. 13A so that the displacement angle θ is the same at the position Pbo on the outermost circumference and that Pbi on the innermost circumference. The displacement angle θ is 5°17' at maximum at the position Pbo on the outermost circumference and the position Pbi on the innermost circumference, and in the recording area R between the two positions the displacement angle θ is below 5°17'. The jitter amount due to the tracking servo drive can be decreased.

With respect to the magneto-optical head A, the associated tracking coil is inclined by 14°53' from the optimum position of the tracking coil when the seek direction Da and the diametric direction Dr agree with each other. This arrangement makes it possible to decrease the displacement angle θ of the magneto-optical disk A in the recording area R to thereby reduce the jitter amount.

Figure 14:
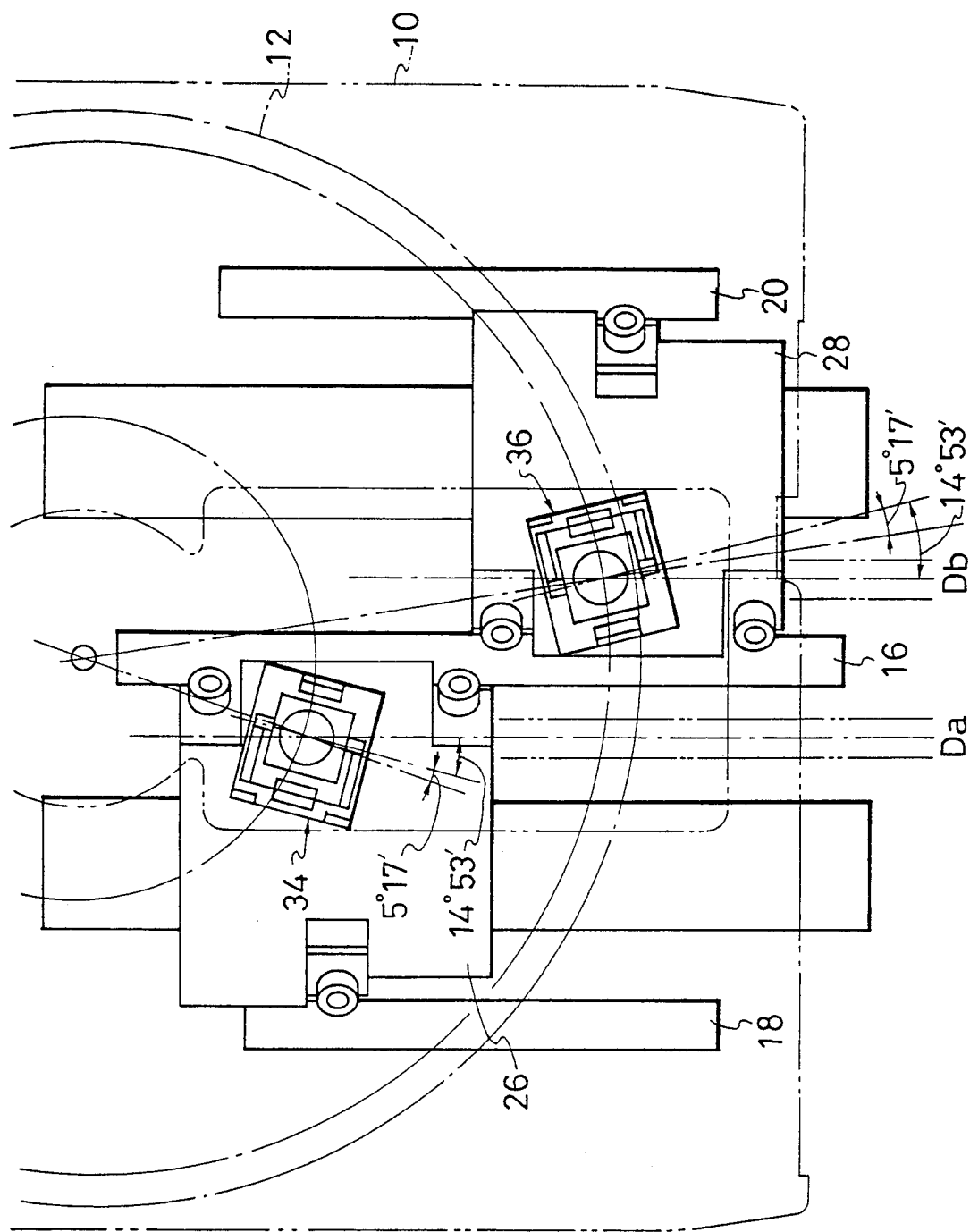

FIG. 14 is an enlarged view of the specific arrangement of the actuators 34, 36. The actuator 34 of the magneto-optical head A is inclined by 14°53' clockwise from the seek direction Da, and the actuator 36 of the magneto-optical head B is inclined by 14°53' counterclockwise from the seek direction Db.

According to this embodiment, when a seek direction is displaced from the diametric direction, the tracking servo drive can be thus performed accurately with respect to all the recording areas of the magneto-optical disk.

Figure 15:
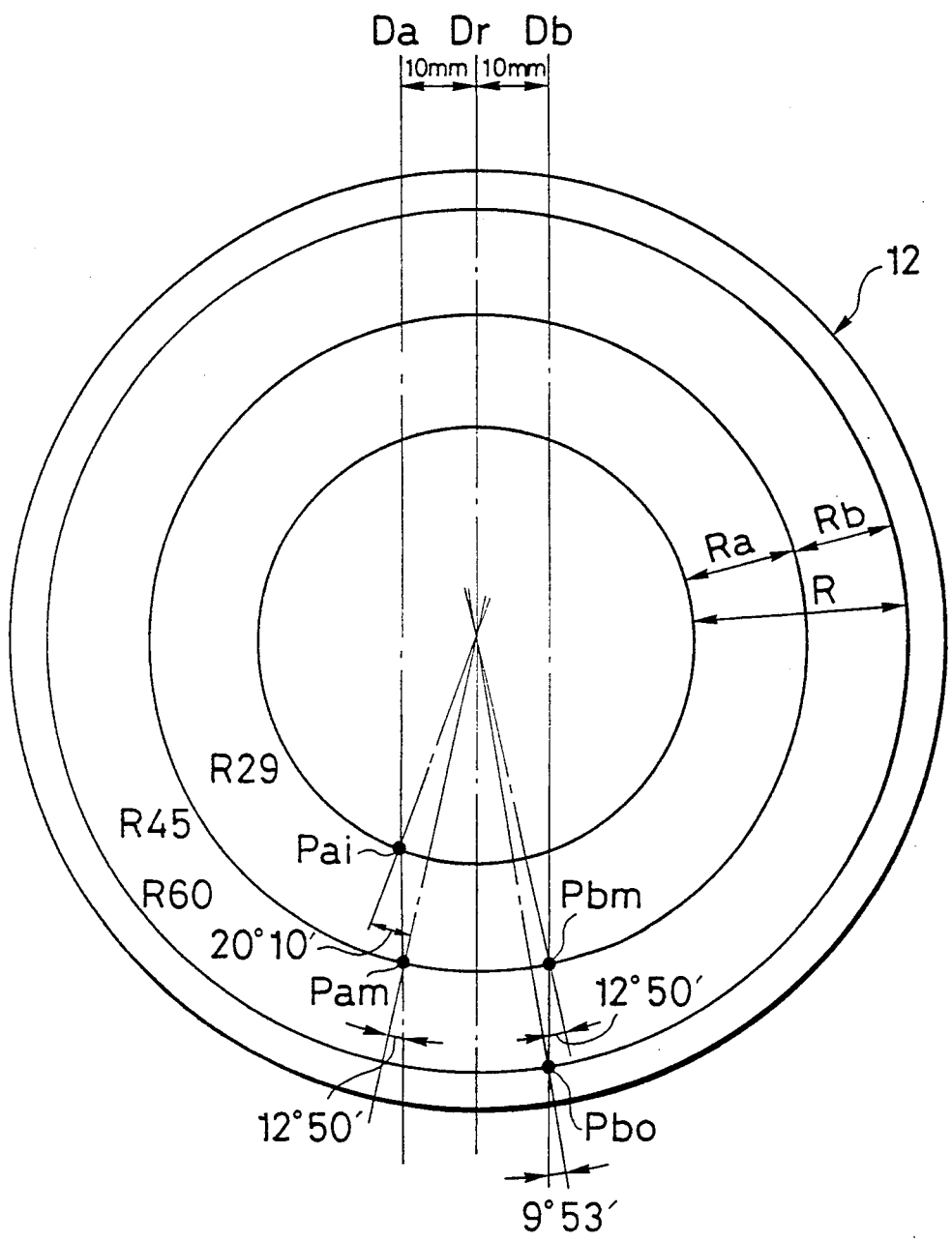
FIG. 15 is a view of another example of the movement of the magneto-optical heads of the magneto-optical disk device of FIG. 1.

In the above-described embodiment, taking into consideration the case that the magneto-optical heads A, B seek all the recording areas of the magneto-optical disk, the displacement angle is the same on the innermost and the outermost circumferences. But in the case that the entire recording area R of the magneto-optical disk 12 is divided in two area, an inner recording area and an outer recording area, and the two recording areas are accessed respectively by the magneto-optical heads A, B, the inclinations of the quadrant photodetector and the tracking coils of the magneto-optical heads A, B are suitably adjusted for the accurate tracking servo drive As shown in FIG. 15, the entire recording area R of the magneto-optical disk 12 is divided into two areas, an inner recording area Ra and an outer recording area Rb. The magneto-optical head A seeks the inner recording area Ra, and the magneto-optical head B seeks the outer recording area Rb. The displacement angle θ of the magneto-optical head A at a position Pai on the 29-mm radius innermost circumference is 20°10', the displacement angle θ at a position Pam on the 45-mm radius boundary between the recording areas Ra and Rb is 12°50', and the displacement angle θ at a position Pbo on the 60-mm radius outermost circumference is 9°53'.

Accordingly with respect to the magneto-optical head A, the quadrant photodetector and the tracking coil are so inclined that the displacement angle is 0 at the central position of the recording area Ra.

That is, the dividing lines of the quadrant photodetector of the optical system 42 are slanted by 16°30' (=(20°10'+12°50')/2) from the optimum positions the dividing lines take when the seek direction Db agrees with the diametric direction Dr. The displacement angle θ of the dividing lines is 3°40' at the positions Pai, Pam of the magneto-optical head A. The displacement angle of the dividing lines is 3°40' at the positions Pai, Pam of the magneto-optical head A.

The tracking coil of the actuator 34 of the magneto-optical head A is slanted by 16°30' from the optimum position the tracking coil takes when the seek direction Db agrees with the diametric direction Dr. The displacement angle θ of the tracking coil is 3°40' at the positions Pai, Pam of the magneto-optical head A.

On the other hand, with respect to the magneto-optical head B, the quadrant photodetector and the tracking coil are so slanted that the displacement angle θ becomes 0 at the central position of the recording area Rb.

That is, the dividing lines of the quadrant photodetector of the optical system 44 are slanted by 11°22' (=(12°50'+9°53')/2) from the optimum positions the dividing lines take when the seek direction Db agrees with the diametric direction Dr. The displacement angle θ of the dividing lines is 1°38' at the positions Pbm, Pbo of the magneto-optical head B.

The actuator 34 of the magneto-optical head A is slanted by 11°22' from the optimum position the actuator 34 takes when the seek direction Db agrees with the diametric direction Dr. The displacement angle θ of the tracking coil is 1°38' at the positions Pai, Pam of the magneto-optical head A.

This invention is not limited to the above-described embodiment and includes various modifications.

In the above-described embodiment, the magneto-optical heads are so slanted that the displacement angle is the same at the innermost and the outermost circumferences of the recording area. But it is possible that, for example, the displacement of the magneto-optical heads on the innermost circumference is smaller than that on the outermost circumference, because the reading conditions are severer on the inner circumferences than the outer circumferences.

In the above-described embodiment, the dividing lines of the quadrant photodetector, and tracking coils of the actuators of the magneto-optical heads are slanted, but one of them may be slanted.

In the above-described embodiment, the magneto-optical heads are of the separate type in which the actuators and the optical systems are separated, but they may be of the integral type in which the actuators and the optical systems are integrated.

As described above, according to this invention, a plurality of magneto-optical heads are accommodated in the head window of a standardized magneto-optical disk cartridge, whereby a large volume of data can be transmitted, and read and written at high speed. Furthermore, accurate tracking servo drive can be performed.

What is claimed is:

1. A magneto-optical disk device in which data are written and read in and from a magneto-optical disk housed in a magneto-optical disk cartridge having a head window of a predetermined shape,
   the magneto-optical disk device comprising:
   first and second magneto-optical heads disposed so as to locate in the head window for accessing the magneto-optical disk;
   driving means for driving the first and second magneto-optical heads to move independently of each other; and
   control means for controlling the first magneto-optical head to write and read data in and from a first area of the magneto-optical disk and controlling the second magneto-optical head to write and read data in and from a second area of the magneto-optical disk.

2. A magneto-optical disk device according to claim 1,
   wherein the first area is on the inner circumferential side of the magneto-optical disk and has a first defect management area for managing defective sectors and a first user's area for recording data, and wherein the second area is on the outer circumferential side of the magneto-optical disk and has a second defect management area for managing defective sectors and a second user's area for recording data.

3. A magneto-optical disk device according to claim 2,
   wherein each of the first and second user's areas is divided in a plurality of groups, each of which has data sectors for recording data and spare sectors for a secondary defect in the data sectors.

4. A magneto-optical disk device according to claim 1,
   wherein the control means controls the first and second magneto-optical heads so that continuous data are divided by optional data volumes to be assigned alternately to the first and second magneto-optical heads.

5. A magneto-optical disk device according to claim 2,
   wherein the control means controls the first and second magneto-optical heads so that continuous data are divided by optional data volumes to be assigned alternately to the first and second magneto-optical heads.

6. A magneto-optical disk device according to claim 3,
   wherein the control means controls the first and second magneto-optical heads so that continuous data are divided by optional data volumes to be assigned alternately to the first and second magneto-optical heads.

7. A magneto-optical disk device in which data are written and read in and from a magneto-optical disk housed in a magneto-optical disk cartridge having a head window of a predetermined shape,
   the magneto-optical disk device comprising:
   first and second magneto-optical heads disposed so as to locate in the head window for accessing the magneto-optical disk;
   a center rail disposed substantially at the center of the window head along a diameter of the magneto-optical disk;
   a first side rail and a second side rail which are disposed parallelly with each other on both sides of the center rail;
   a first carriage slidably disposed between the center rail and the first side rail, and having at least a part of the first magneto-optical head mounted thereon;
   first driving means for driving the first carriage along the center rail;
   a second carriage slidably disposed between the center rail and the second side rail, and having at least a part of the second magneto-optical head mounted thereon; and
   second driving means for driving the second carriage along the center rail.

8. A magneto-optical disk device according to claim 7,
   wherein the first carriage has a first objective for irradiating a laser beam to the magneto-optical disk and a first actuator for driving the first objective mounted thereon; and
   the second carriage has a second objective for irradiating a laser beam to the magneto-optical disk and a second actuator for driving the second objective mounted thereon.

9. A magneto-optical disk device according to claim 7,
   wherein the first driving means has a bracket-shaped lower yoke, an upper yoke disposed on the lower yoke, and a flat magnet disposed on the inside bottom of the lower yoke, and the first carriage has a coil through which the upper yoke of the first driving means is passed; and
   the second driving means has a bracket-shaped lower yoke, an upper yoke disposed on the lower yoke, and a flat magnet disposed on the inside bottom of the lower yoke, and the second carriage has a coil through which the upper yoke of the second driving means is passed.

10. A magneto-optical disk device according to claim 8,
wherein the first driving means has a bracket-shaped lower yoke, an upper yoke disposed on the lower yoke, and a flat magnet disposed on the inside bottom of the lower yoke, and the first carriage has a coil through which the upper yoke of the first driving means is passed; and
the second driving means has a bracket-shaped lower yoke, an upper yoke disposed on the lower yoke, and a flat magnet disposed on the inside bottom of the lower yoke, and the second carriage has a coil through which the upper yoke of the second driving means is passed.

11. A magneto-optical disk device according to claim 8, further comprising:
a first bias magnet disposed above the magneto-optical disk for applying a bias magnetic field to a position corresponding to a moving area of the first actuator of the first carriage; and
a second bias magnet disposed above the magneto-optical disk for applying a bias magnetic field to a position corresponding to a moving area of the second actuator of the second carriage.

12. A magneto-optical disk device according to claim 10, further comprising:
a first bias magnet disposed above the magneto-optical disk for applying a bias magnetic field to a position corresponding to a moving area of the first actuator of the first carriage; and
a second bias magnet disposed above the magneto-optical disk for applying a bias magnetic field to a position corresponding to a moving area of the second actuator of the second carriage.

13. A magneto-optical disk device in which data are written and read in and from a magneto-optical disk housed in a magneto-optical disk cartridge having a head window of a predetermined shape,
the magneto-optical disk device comprising:
first and second magneto-optical heads for accessing the magneto-optical disk disposed so as to locate in the head window;
a first quadrant photodetector for detecting tracking errors of the first magneto-optical head, dividing lines of the first quadrant photodetector being slanted by a set angle so that the dividing lines substantially agree with a track direction of the magneto-optical disk in a recording area of the magneto-optical disk accessed by the first magneto-optical head; and
a second quadrant photodetector for detecting tracking errors of the second magneto-optical head, dividing lines of the second quadrant photodetector being slanted by a set angle so that the dividing lines substantially agree with a track direction of the magneto-optical disk in a recording area of the magneto-optical disk accessed by the second magneto-optical head.

14. A magneto-optical disk device in which data are written and read in and from a magneto-optical disk housed in a magneto-optical disk cartridge having a head window of a predetermined shape,
the magneto-optical disk device comprising:
first and second magneto-optical heads for accessing the magneto-optical disk disposed so as to locate in the head window;
a first tracking coil for driving a first objective of the first magneto-optical head in a direction perpendicular to a track direction of the magneto-optical disk, an axes of the first tracking coil being slanted by a set angle so that a drive direction of the first tracking coil is substantially perpendicular to the track direction in a recording area of the magneto-optical disk accessed by the first magneto-optical head; and
a second tracking coil for driving a second objective of the second magneto-optical head in a direction perpendicular to a track direction of the magneto-optical disk, an axes of the second tracking coil being slanted by a set angle so that a drive direction of the second tracking coil is substantially perpendicular to the track direction in a recording area of the magneto-optical disk accessed by the second magneto-optical head.

15. A magneto-optical disk device according to claim 13, further comprising:
a first tracking coil for driving a first objective of the first magneto-optical head in a direction perpendicular to the track direction, an axes of the first tracking coil being slanted by a set angle so that a drive direction of the first tracking coil is substantially perpendicular to the track direction in the recording area of the magneto-optical disk accessed by the first magneto-optical head; and
a second tracking coil for driving a second objective of the second magneto-optical head in a direction perpendicular to the track direction, an axes of the second tracking coil being slanted by a set angle so that a drive direction of the second tracking coil is substantially perpendicular to the track direction in the recording area of the magneto-optical disk accessed by the second magneto-optical head.

16. A magneto-optical disk device according to claim 13,
wherein the recording area of the magneto-optical disk accessed by the first magneto-optical head is on the inner circumferential side of the magneto-optical disk; and
the recording area of the magneto-optical disk accessed by the second magneto-optical head is on the outer circumferential side of the magneto-optical disk.

17. A magneto-optical disk device according to claim 14,
wherein the recording area of the magneto-optical disk accessed by the first magneto-optical head is on the inner circumferential side of the magneto-optical disk; and
the recording area of the magneto-optical disk accessed by the second magneto-optical head is on the outer circumferential side of the magneto-optical disk.

18. A magneto-optical disk device according to claim 15,
wherein the recording area of the magneto-optical disk accessed by the first magneto-optical head is on the inner circumferential side of the magneto-optical disk; and
the recording area of the magneto-optical disk accessed by the second magneto-optical head is on the outer circumferential side of the magneto-optical disk.

* * * * *